(12) United States Patent
Light et al.

(10) Patent No.: US 11,304,471 B2
(45) Date of Patent: Apr. 19, 2022

(54) MOISTURE CONTROLLING LATTICE LINERS FOR HELMETS AND OTHER WEARABLE ARTICLES

(71) Applicant: Carbon, Inc., Redwood City, CA (US)

(72) Inventors: Allison Light, Orinda, CA (US); Ananda Day, San Francisco, CA (US); Mohamed Imran Jameel, Redwood City, CA (US); W. Ryan Powell, Sunnyvale, CA (US)

(73) Assignee: Carbon, Inc., Redwood City, CA (US)

( * ) Notice: Subject to any disclaimer, the term of this patent is extended or adjusted under 35 U.S.C. 154(b) by 296 days.

(21) Appl. No.: 16/598,248

(22) Filed: Oct. 10, 2019

(65) Prior Publication Data

US 2020/0113267 A1    Apr. 16, 2020

Related U.S. Application Data

(60) Provisional application No. 62/744,761, filed on Oct. 12, 2018.

(51) Int. Cl.
*A42B 3/06* (2006.01)
*A42B 3/12* (2006.01)
*B33Y 80/00* (2015.01)

(52) U.S. Cl.
CPC ............ *A42B 3/12* (2013.01); *A42B 3/06* (2013.01); *B33Y 80/00* (2014.12)

(58) Field of Classification Search
CPC ............. A42B 3/12; A42B 3/06; B33Y 80/00
See application file for complete search history.

(56) References Cited

U.S. PATENT DOCUMENTS

| 4,443,891 | A | * | 4/1984 | Blomgren | A42B 3/127 2/414 |
| 6,607,562 | B2 | | 8/2003 | Ghorashi et al. | |
| 6,728,969 | B2 | * | 5/2004 | Zeiler | A01K 55/00 2/4 |
| 7,765,622 | B2 | * | 8/2010 | Wiles | A42B 3/125 2/414 |
| 8,127,575 | B2 | | 3/2012 | Burrow et al. | |
| 9,062,913 | B2 | | 6/2015 | Araujo et al. | |
| 9,392,831 | B2 | * | 7/2016 | Storelli | A42B 1/08 |
| 9,738,013 | B1 | | 8/2017 | Yang et al. | |

(Continued)

FOREIGN PATENT DOCUMENTS

| EP | 3000341 A1 | 3/2016 |
| WO | 2020086370 A1 | 4/2020 |
| WO | 2021046376 A1 | 3/2021 |

OTHER PUBLICATIONS

Al-Ketan, Oraib , et al., "Multifunctional mechanical-metamaterials based on triply periodic minimal surface lattices: A review", Advance Engineering Materials, vol. 21, No. 10, Aug. 20, 2019 (Aug. 20, 2019), 81 pages.

*Primary Examiner* — Tajash D Patel
(74) *Attorney, Agent, or Firm* — Myers Bigel, P.A.

(57) ABSTRACT

A helmet liner includes: (a) an open lattice body portion comprised of a polymer, the body portion having opposite face portions and a circumferential side portion; (b) a helmet contact surface portion formed on one of the face portions; and (c) a skin contact portion formed on the other of the face portions, the skin contact portion configured with the lattice body portion so air can circulate through both the body portion and the skin contact portion.

28 Claims, 3 Drawing Sheets

(56) References Cited

U.S. PATENT DOCUMENTS

| | | | |
|---|---|---|---|
| 9,820,524 B1* | 11/2017 | Whitcomb | F41H 1/04 |
| 9,839,251 B2* | 12/2017 | Pannikottu | A42B 3/125 |
| 10,384,394 B2 | 8/2019 | McCluskey | |
| 10,875,239 B2 | 12/2020 | McCluskey | |
| 2012/0196100 A1 | 8/2012 | Boyce et al. | |
| 2014/0259326 A1* | 9/2014 | Carlson | A41D 13/015 2/455 |
| 2016/0235133 A1* | 8/2016 | Chase, Jr. | A42B 1/08 |
| 2016/0327113 A1* | 11/2016 | Shelley | B33Y 80/00 |
| 2017/0029989 A1* | 2/2017 | Tuscia | B32B 27/12 |
| 2017/0327066 A1 | 11/2017 | Lakic | |
| 2018/0027915 A1* | 2/2018 | Cadens Ballarin | A42B 3/122 |
| 2018/0153245 A1* | 6/2018 | Pannikottu | A63B 71/081 |
| 2019/0009458 A1* | 1/2019 | Li | B33Y 80/00 |
| 2019/0231018 A1 | 8/2019 | Boutin | |
| 2020/0100554 A1 | 4/2020 | Bologna et al. | |
| 2020/0113267 A1 | 4/2020 | Light et al. | |
| 2020/0154803 A1 | 5/2020 | Goulet et al. | |
| 2020/0215415 A1 | 7/2020 | Bologna et al. | |
| 2021/0024775 A1 | 1/2021 | Rolland et al. | |

* cited by examiner

MOISTURE CONTROLLING LATTICE LINERS FOR HELMETS AND OTHER WEARABLE ARTICLES

RELATED APPLICATIONS

This application claims priority from U.S. Provisional Application No. 62/744,761, filed Oct. 12, 2018, the disclosure of which is hereby incorporated by reference herein in its entirety.

FIELD OF THE INVENTION

The present invention concerns liners for helmets and other protective articles that are produced by additive manufacturing.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

There is great interest in developing improved helmets and other protective devices, including the liners thereof. See, for example, U.S. Pat. Nos. 9,839,251; 9,820,524; 9,392,831; and 7,765,622. However, the utility of additive manufacturing for developing new and unique components for such protective devices has yet to be fully explored.

SUMMARY OF THE INVENTION

Some embodiments of the present invention are directed to a helmet liner including: (a) an open lattice body portion comprised of a polymer, the body portion having opposite face portions and a circumferential side portion; (b) a helmet contact surface portion formed on one of the face portions; and (c) a skin contact portion formed on the other of the face portions, the skin contact portion configured with the lattice body portion so air can circulate through both the body portion and the skin contact portion.

In some embodiments, the body portion includes a base portion and a plurality of fingers extending from the base portion. The fingers may be separated by gaps.

In some embodiments, the circumferential side portion includes side openings configured to circulate air therethrough and into the lattice body portion.

In some embodiments, the helmet liner further includes a breathable wicking fabric connected to the liner and overlying the skin contact portion.

In some embodiments, the lattice body portion is comprised of a plurality of interconnected struts (e.g., struts having an average diameter of from 0.3 millimeters to 3 millimeters).

In some embodiments, the lattice body portion is comprised of repeating tetrahedral unit cells (e.g., tetrahedral unit cells ranging from 1 millimeter to 10 millimeters in size).

In some embodiments, the helmet contact surface portion is generally flat. The skin contact portion may be configured as a smoothed segment of the lattice body portion. The body portion may be rigid, flexible, or elastic.

In some embodiments, the liner is configured to cushion a wearer from the helmet. The liner may be configured to wick perspiration away from a wearer, and/or wick perspiration along the skin contact portion to thereby more rapidly disperse perspiration of a wearer.

In some embodiments, the body portion is comprised of a plurality (e.g., at least two or three) interconnected body members. Each body member may be produced by the process of additive manufacturing from a light polymerizable resin.

In some embodiments, the helmet liner is produced by the process of additive manufacturing (e.g., selective laser sintering (SLS), fused deposition modeling (FDM), stereolithography (SLA), three-dimensional printing (3DP), or multijet modeling (MJM)).

In some embodiments, the helmet liner is produced by the process of stereolithography from a light-polymerizable resin, optionally wherein the resin includes a dual cure resin. The process may include forming the body portion or body members as at least one intermediate by additive manufacturing, optionally interconnecting the members, and then further curing (e.g., by heating and/or microwave irradiating) the intermediate.

Some other embodiments of the present invention are directed to a helmet including: (a) a rigid, shock-absorbing, protective shell having an interior surface and an exterior surface; and (b) a helmet liner as described herein, with the helmet contact surface portion connected to the helmet interior surface.

In some embodiments, the protective shell includes at least one shock-absorbing component (e.g., a crushable closed cell foam, at least one rigid or elastic open-cell polymer lattice, at least one fluid-filled bladder, or a combination thereof).

In some embodiments, the protective shell has a plurality of vents formed therein. The vents may subdivide the shell into a plurality of ribs. The fingers of the body portion may be connected or contacted to and aligned with said ribs. At least some of the side portion openings of the liner may be adjacent and/or open to the vents of the helmet. The protective shell may have a lower perimeter, and at least some of the side portion openings of the liner may be adjacent and/or open to the lower perimeter of the helmet.

In some embodiments, the protective shell includes a crushable closed cell foam.

In some embodiments, the helmet is configured as a bicycling, skiing, motorcycling, combat, skydiving, football, baseball, lacrosse, ice hockey, construction, or horseback riding helmet.

Some other embodiments of the present invention are directed to a liner for a wearable article (e.g., a wearable protective device), including: (a) an open lattice body portion comprised of a polymer, the body portion having opposite face portions and a circumferential side portion; (b) a garment or wearable protector contact surface portion formed on one of the face portions; and (c) a skin or body contact portion formed on the other of said face portions, the skin or body contact portion configured with the lattice body portion so air can circulate through the body portion and through the skin or body contact portion to contact the skin of a wearer.

In some embodiments, the liner is configured for installation into or onto a wearable protective device, wherein said wearable protective device is a shin guard, knee pad, elbow pad, sports brassiere, bicycling shorts, backpack strap, backpack back, neck brace, chest protector, protective vest, protective jackets, slacks, suits, overalls, jumpsuit, and/or protective slacks.

In some embodiments, the circumferential side portion includes side openings configured to circulate air therethrough and into the lattice body portion.

In some embodiments, the liner further includes a breathable wicking fabric connected to the liner and overlying the skin or body contact portion.

In some embodiments, the lattice body portion is comprised of a plurality of interconnected struts (e.g., struts having an average diameter of from 0.3 millimeters to 3 millimeters).

In some embodiments, the lattice body portion is comprised of repeating tetrahedral unit cells (e.g., tetrahedral unit cells ranging from 1 millimeter to 10 millimeters in size).

In some embodiments, the garment or wearable protector contact surface portion is generally flat. The skin or body contact portion may be configured as a smoothed segment of the lattice body portion. The body portion may be rigid, flexible, or elastic.

In some embodiments, the liner is configured to cushion a wearer from the garment or wearable protector contact surface portion.

In some embodiments, the liner is configured to wick perspiration away from a wearer, and/or wick perspiration along the skin or body contact portion to thereby more rapidly disperse perspiration of a wearer.

In some embodiments, the body portion includes a plurality (e.g., at least two or three) interconnected body members. Each body member may be produced by the process of additive manufacturing from a light polymerizable resin.

In some embodiments, the liner is produced by the process of additive manufacturing (e.g., selective laser sintering (SLS), fused deposition modeling (FDM), stereolithography (SLA), three-dimensional printing (3DP), or multijet modeling (MJM)).

In some embodiments, the liner is produced by the process of stereolithography from a light-polymerizable resin, optionally wherein said resin comprises a dual cure resin. The process may include forming the body portion or body members as at least one intermediate by additive manufacturing, optionally interconnecting the members, and then further curing (e.g., by heating and/or microwave irradiating) the intermediate.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
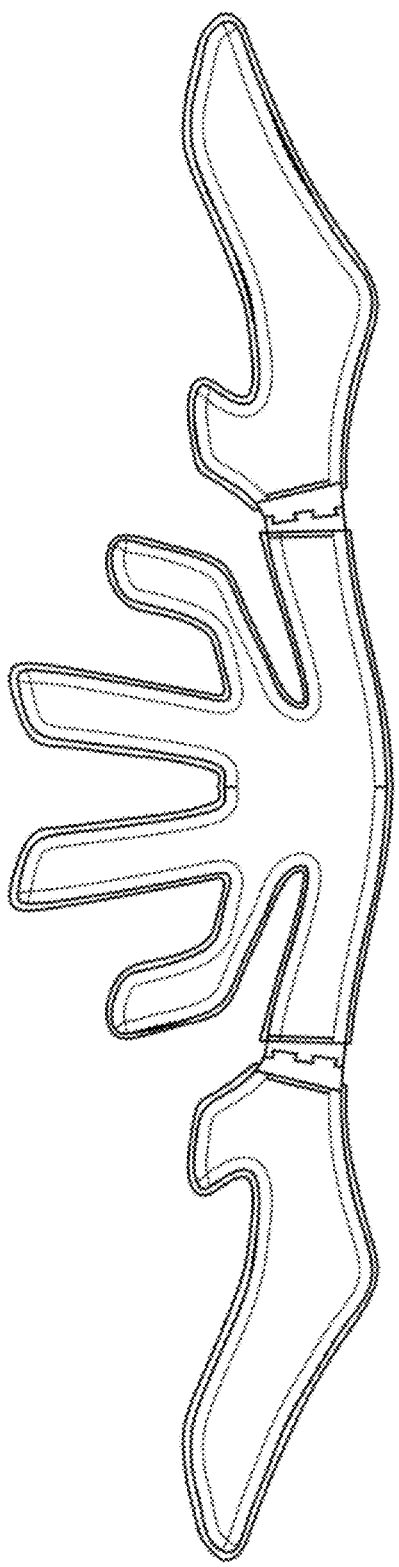
FIG. 1 is a top plan view of a drawing of a helmet liner of the present invention.
Figure 2:
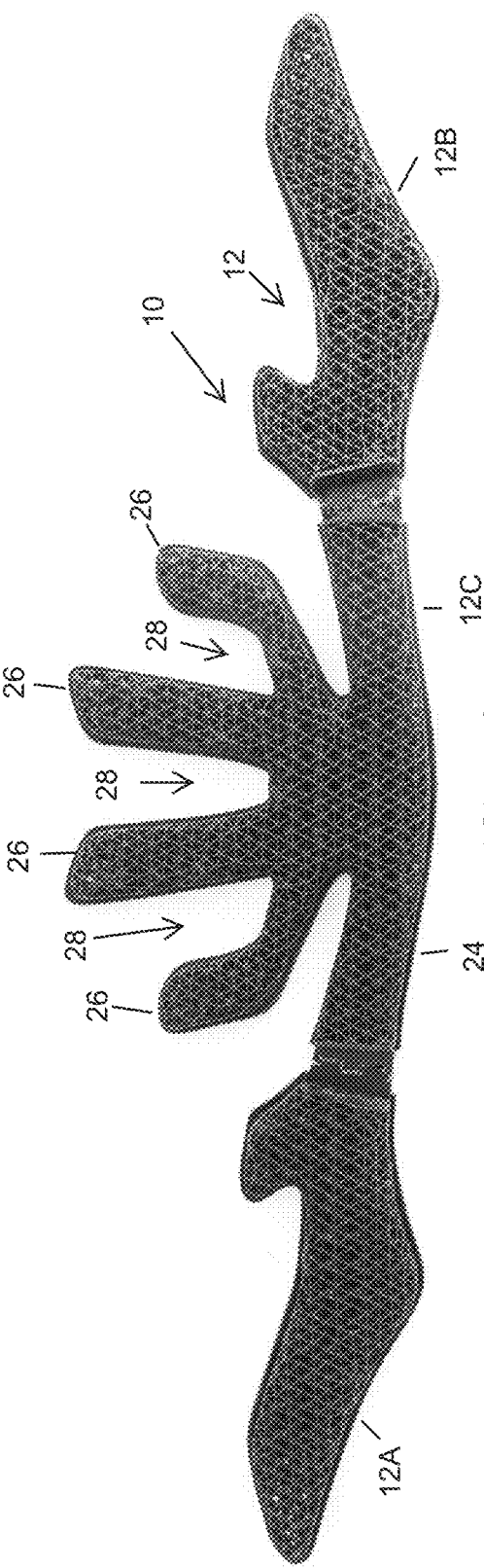
FIG. 2 is a top plan view of a helmet liner of the present invention, as produced by additive manufacturing.
Figure 3:
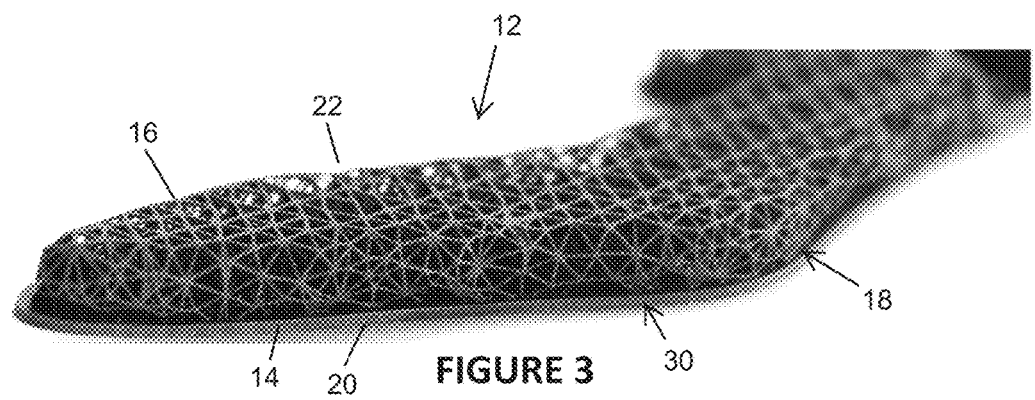
FIG. 3 is a detail perspective view of the helmet liner of FIG. 2.
Figure 4:
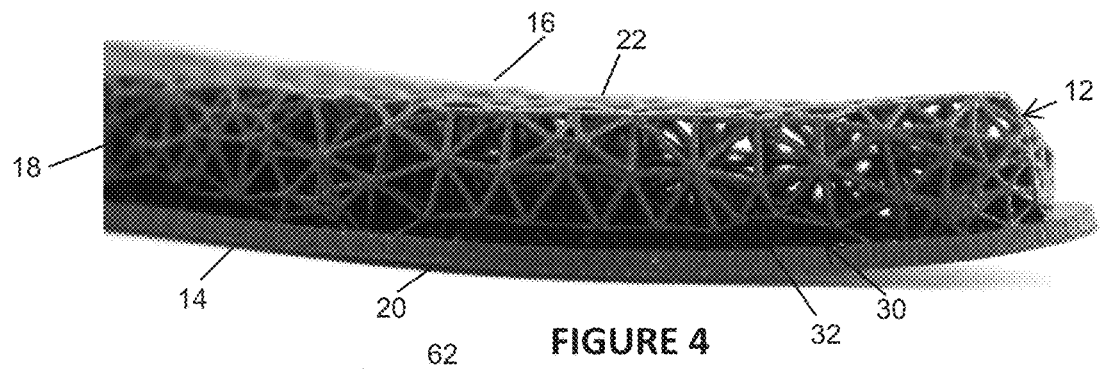
FIG. 4 is a side view of a portion of the helmet liner of FIGS. 2 and 3, more clearly showing the openings formed in the circumferential side wall portion.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Methods, Apparatus and Resins

Resins for additive manufacturing are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Techniques for additive manufacturing are known. Suitable techniques include, but are not limited to, techniques such as selective laser sintering (SLS), fused deposition modeling (FDM), stereolithography (SLA), material jetting including three-dimensional printing (3DP) and multijet modeling (MJM) (MJM including Multi-Jet Fusion such as available from Hewlett Packard), and others. See, e.g., H. Bikas et al., *Additive manufacturing methods and modelling approaches: a critical review*, Int. J. Adv. Manuf Technol. 83, 389-405 (2016).

Stereolithography, including bottom-up and top-down techniques, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

After the object is formed, it is typically cleaned as described below, and in some embodiments then further cured, preferably by baking (although further curing may in some embodiments be concurrent with the first cure, or may be by different mechanisms such as contacting to water, as described in U.S. Pat. No. 9,453,142 to Rolland et al.).

2. Liners for Helmets and Other Wearable Articles

A helmet liner 10 according to some embodiments is illustrated in FIGS. 1-4. The helmet liner 10 includes an open lattice body portion 12 (e.g., comprised of a polymer). The body portion 12 has first and second opposite face portions 14, 16 and a circumferential side portion 18. A helmet contact surface portion 20 is formed on one of the face portions such as the first face portion 14. A skin contact portion 22 is formed on the other of the face portions such as the second face portion 16. The skin contact portion 22 is configured with the lattice body portion 12 so air can circulate through both the body portion 12 and the skin contact portion 22.

The body portion may include a base portion 24 and a plurality of fingers 26 extending from the base portion 24. The fingers 26 may be separated by gaps 28.

The circumferential side portion 18 may include side openings 30 configured to circulate air therethrough and into the lattice body portion 12.

In some embodiments, the helmet liner 10 includes a breathable wicking fabric connected to the liner and overlying the skin contact portion 22.

The lattice body portion 12 may include a plurality of interconnected struts 32 (e.g., struts having an average diameter of from 0.3 millimeters to 3 millimeters). The lattice body portion 12 may include repeating tetrahedral unit cells (e.g., tetrahedral unit cells ranging from 1 millimeter to 10 millimeters in size).

Lattices used herein may take any of a variety of forms, including but not limited to tetrahedral, Voronoi, centroidal tetrahedral, or various hex lattices, including combinations thereof. In general, a lattice comprises a plurality of interconnected struts with open interconnected spaces throughout.

The helmet contact surface portion 20 may be flat or generally flat. The skin contact portion 22 may be configured as a smoothed segment of the lattice body portion 12. The body portion 12 may be rigid, flexible, or elastic.

The liner 10 may be configured to cushion a wearer from the helmet (e.g., to which the liner 10 is connected). The liner 10 may be configured to wick perspiration away from a wearer, and/or wick perspiration along the skin contact portion 22 to thereby more rapidly disperse perspiration of a wearer.

The body portion 12 may include a plurality (e.g., at least two or three) interconnected body members such as 12A, 12B, 12C. Each body member may be produced by the process of additive manufacturing from a light polymerizable resin.

The helmet liner 10 may be produced by the process of additive manufacturing (e.g., selective laser sintering (SLS), fused deposition modeling (FDM), stereolithography (SLA), three-dimensional printing (3DP), or multijet modeling (MJM)).

The helmet liner 10 may be produced by the process of stereolithography from a light-polymerizable resin, optionally wherein said resin includes a dual cure resin. The process may include forming the body portion 12 or body members as at least one intermediate by additive manufacturing, optionally interconnecting the members, and then further curing (e.g., by heating and/or microwave irradiating) the intermediate.

Figure 5:
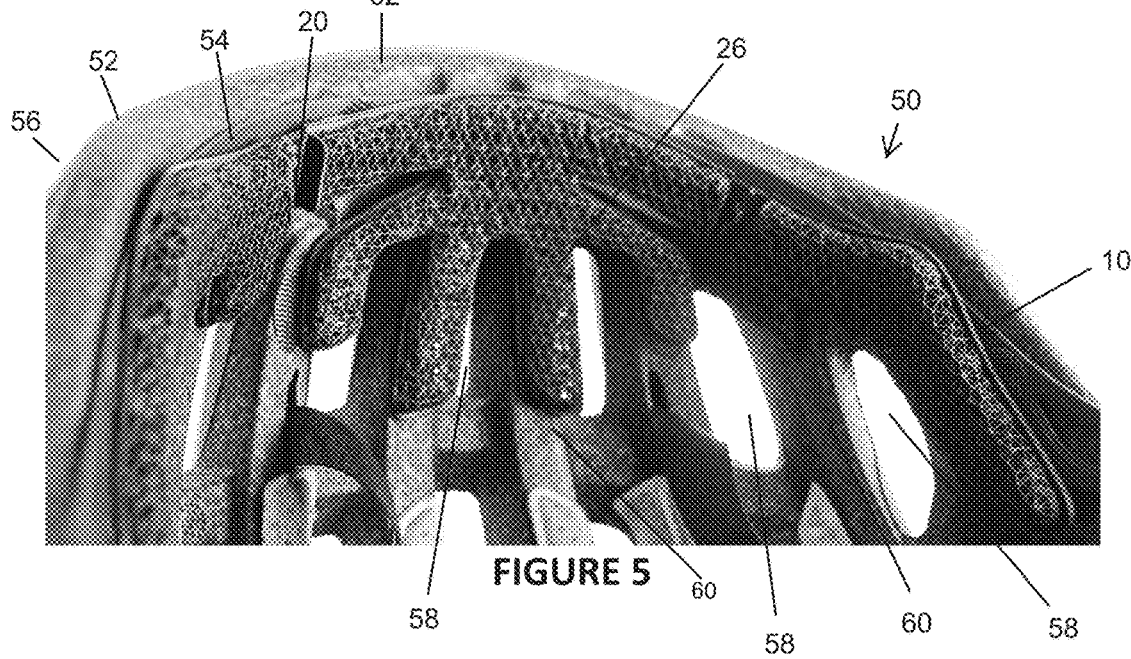
FIG. 5 is a perspective view of the helmet liner of FIGS. 2-4, installed in a helmet.

A helmet 50 according to some embodiments is illustrated in FIG. 5. The helmet 50 includes a rigid, shock-absorbing, protective shell 52 having an interior surface 54 and an exterior surface 56. The helmet 50 includes a helmet liner as described herein, such as the helmet liner 10 described above. The helmet contact surface portion 20 may be connected to the helmet interior surface 54.

The protective shell 52 may include at least one shock-absorbing component (e.g., a crushable closed cell foam, at least one rigid or elastic open-cell polymer lattice, at least one fluid-filled bladder, or a combination thereof).

The protective shell 52 may have a plurality of vents 58 formed therein. The vents 58 may subdivide the shell 52 into a plurality of ribs 60. The fingers 26 of the body portion 12 may be connected or contacted to and aligned with the ribs 60. At least some of the side portion openings 30 of the liner 10 may be adjacent and/or open to vents 58 of the helmet 50.

The protective shell 52 may have a lower perimeter 62. At least some of the side portion openings 30 of the liner 10 may be adjacent and/or open to the lower perimeter 62 of the helmet 50.

The helmet 50 may be configured as a bicycling, skiing, motorcycling, combat, skydiving, football, baseball, lacrosse, ice hockey, construction, or horseback riding helmet.

Figure 6:
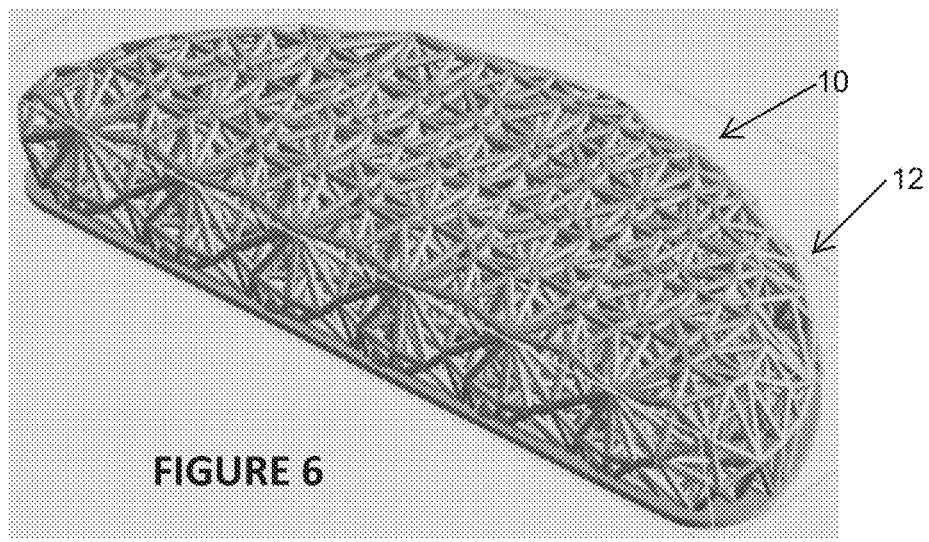
FIG. 6 is a perspective view of a second embodiment of a helmet liner of the present invention.
Figure 7:
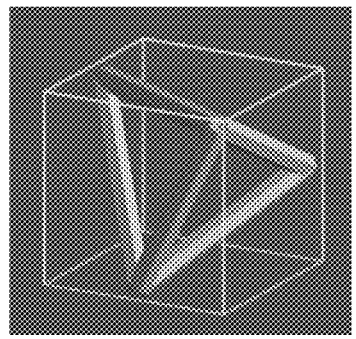
FIG. 7 is a perspective view of a tetrahedeal unit cell from which a lattice may be formed, which lattice may be used in some embodiments of a helmet liner of the present invention.
Figure 8:
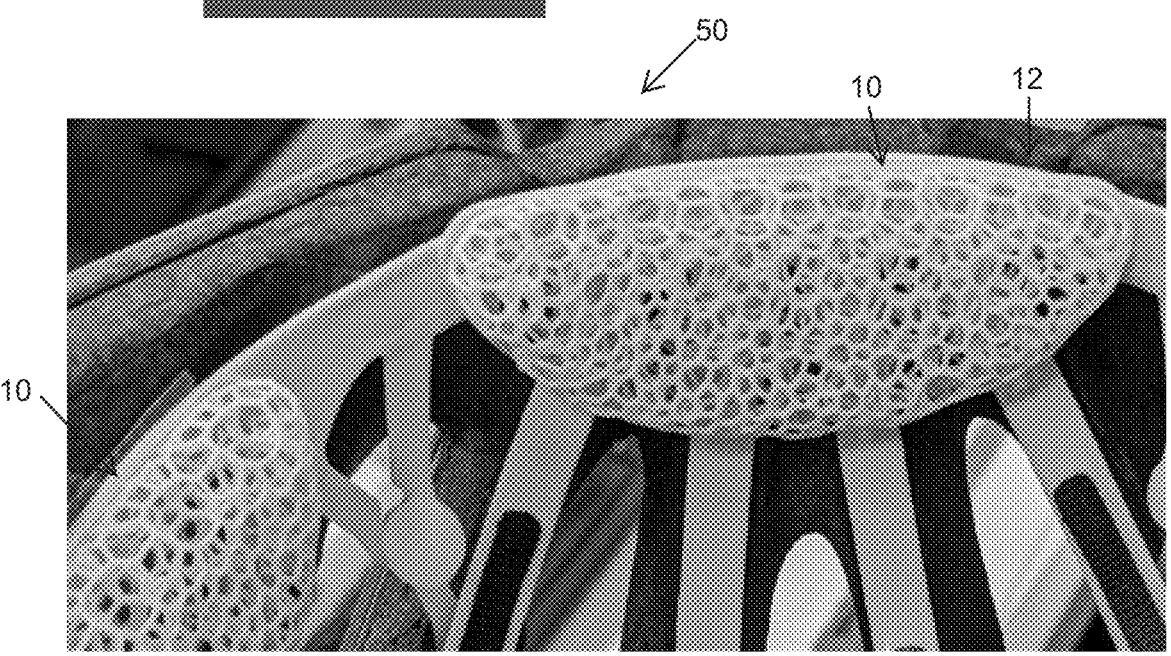
FIG. 8 is a perspective view of a third embodiment of a helmet liner of the present invention, installed in a helmet.

FIGS. 6 and 8 illustrated alternative embodiments of the liner 10, and FIG. 8 further shows at least one of the liners 10 connected to the helmet 50.

The liners 10 as described herein may also be configured as a liner for a wearable article (e.g., a wearable protective device). The liner 10 includes the open lattice body portion 12 (e.g., comprised of a polymer). The body portion 12 has the opposite face portions 14, 16 and the circumferential side portion 18. The liner 10 includes a garment or wearable protector contact surface portion 20 formed on one of the face portions (e.g., on the face portion 14). The liner 10 includes a skin or body contact portion 22 formed on the other of the face portions (e.g., the face portion 16). The skin or body contact portion 22 is configured with the lattice body portion 12 so air can circulate through the body portion 12 and through the skin or body contact portion 22 to contact the skin of a wearer.

The liner may be configured for installation into or onto a wearable protective device. The wearable protective device may be a shin guard, knee pad, elbow pad, sports brassiere, bicycling shorts, backpack strap, backpack back, neck brace, chest protector, protective vest, protective jackets, slacks, suits, overalls, jumpsuit, and/or protective slacks.

Breathable wicking fabrics (including woven and non-woven fabrics, and natural and synthetic fabrics) are known and any of a variety thereof can be used to carry out the present invention. Specific examples thereof include, but are not limited to, those set forth in U.S. Pat. Nos. 9,062,913; 8,127,575; and 6,607,562.

The foregoing is illustrative of the present invention, and is not to be construed as limiting thereof. The invention is defined by the following claims, with equivalents of the claims to be included therein.

We claim:

1. A helmet liner, comprising:
   (a) an open lattice body portion comprised of a polymer, said body portion having opposite face portions and a circumferential side portion;
   (b) a helmet contact surface portion formed on one of said face portions; and
   (c) a skin contact portion formed on the other of said face portions, said skin contact portion configured with said lattice body portion so air can circulate through both said body portion and said skin contact portion, wherein said lattice body portion is comprised of a plurality of interconnected struts having an average diameter of 0.3 mm to 3 mm.

2. The helmet liner of claim 1, wherein said body portion comprises a base portion and a plurality of fingers extending from said base portion, said fingers separated by gaps.

3. The helmet liner of claim 1, wherein said circumferential side portion comprises side openings adjacent the helmet contact surface portion and configured to circulate air therethrough and into said lattice body portion.

4. The helmet liner of claim 1, further comprising:
(d) a breathable wicking fabric connected to said liner and overlying said skin contact portion.

5. The helmet liner of claim 1, wherein said lattice body portion is comprised of repeating tetrahedral unit cells.

6. The helmet liner of claim 1, wherein:
said helmet contact surface portion is generally flat, and/or
said skin contact portion is configured as a smoothed segment of said lattice body portion.

7. The helmet liner of claim 1, wherein said body portion is rigid, flexible, or elastic.

8. The helmet liner of claim 1, said liner configured to cushion a wearer from the helmet.

9. The helmet liner of claim 1, said liner configured to wick perspiration away from a wearer, and/or wick perspiration along said skin contact portion to thereby more rapidly disperse perspiration of a wearer.

10. The helmet liner of claim 1, wherein said body portion is comprised of a plurality of interconnected body members, each body member produced by the process of additive manufacturing from a light polymerizable resin.

11. The helmet liner of claim 1 produced by the process of additive manufacturing.

12. The helmet liner of claim 1 produced by the process of stereolithography from a light-polymerizable resin, optionally wherein said resin comprises a dual cure resin; and/or optionally wherein said process comprises forming said body portion or body members as at least one intermediate by additive manufacturing, optionally interconnecting said members, and then further curing said intermediate.

13. A helmet comprising:
(a) a rigid, shock-absorbing, protective shell having an interior surface and an exterior surface; and
(b) a helmet liner comprising:
(a') an open lattice body portion comprised of a polymer, said body portion having opposite face portions and a circumferential side portion;
(b') a helmet contact surface portion formed on one of said face portions; and
(c') a skin contact portion formed on the other of said face portions, said skin contact portion configured with said lattice body portion so air can circulate through both said body portion and said skin contact portion,
wherein said helmet contact surface portion is connected to said helmet interior surface,
wherein:
said body portion comprises a base portion and a plurality of fingers extending from said base portion, said fingers separated by gaps;
said circumferential side portion comprises side openings configured to circulate air therethrough and into said lattice body portion;

said protective shell has a plurality of vents formed therein, said vents subdividing said shell into a plurality of ribs, and said fingers of said body portion are connected or contacted to and aligned with said ribs, and at least some of said side portion openings of said liner are adjacent and/or open to said vents of said helmet; and/or
said protective shell has a lower perimeter, and at least some of said side portion openings of said liner are adjacent and/or open to said lower perimeter of said helmet.

14. The helmet of claim 13, wherein said protective shell includes at least one shock-absorbing component.

15. The helmet of claim 13, wherein said protective shell comprises a crushable closed cell foam.

16. The helmet of claim 13, wherein said helmet is configured as a bicycling, skiing, motorcycling, combat, skydiving, football, baseball, lacrosse, ice hockey, construction, or horseback riding helmet.

17. A liner for a wearable article, comprising:
(a) an open lattice body portion comprised of a polymer, said body portion having opposite face portions and a circumferential side portion;
(b) a garment or wearable protector contact surface portion formed on one of said face portions; and
(c) a skin or body contact portion formed on the other of said face portions, said skin or body contact portion configured with said lattice body portion so air can circulate through said body portion and through said skin or body contact portion to contact the skin of a wearer,
wherein said circumferential side portion comprises side openings adjacent said garment or wearable protector contact surface portion and configured to circulate air therethrough and into said lattice body portion.

18. The liner of claim 17, wherein said liner is configured for installation into or onto a wearable protective device, wherein said wearable protective device is a shin guard, knee pad, elbow pad, sports brassiere, bicycling shorts, backpack strap, backpack back, neck brace, chest protector, protective vest, protective jackets, slacks, suits, overalls, jumpsuit, and/or protective slacks.

19. The liner of claim 17, further comprising:
(d) a breathable wicking fabric connected to said liner and overlying said skin or body contact portion.

20. The liner of claim 17, wherein said lattice body portion is comprised of a plurality of interconnected struts having an average diameter of 0.3 mm to 3 mm.

21. The liner of claim 17, wherein said lattice body portion is comprised of repeating tetrahedral unit cells.

22. The liner of claim 17, wherein:
said garment or wearable protector contact surface portion is generally flat, and/or
said skin or body contact portion is configured as a smoothed segment of said lattice body portion.

23. The liner of claim 17, wherein said body portion is rigid, flexible, or elastic.

24. The liner of claim 17, said liner configured to cushion a wearer from the garment or wearable protector contact surface portion.

25. The liner of claim 17, said liner configured to wick perspiration away from a wearer, and/or wick perspiration along said skin or body contact portion to thereby more rapidly disperse perspiration of a wearer.

26. The liner of claim 17, wherein said body portion is comprised of a plurality interconnected body members, each body member produced by the process of additive manufacturing from a light polymerizable resin.

27. The liner of claim 17 produced by the process of additive manufacturing.

28. The liner of claim 17 produced by the process of stereolithography from a light-polymerizable resin, optionally wherein said resin comprises a dual cure resin;

and/or optionally wherein said process comprises forming said body portion or body members as at least one intermediate by additive manufacturing, optionally interconnecting said members, and then further curing said intermediate.

* * * * *